(12) United States Patent
Watanabe (10) Patent No.: US 7,405,005 B2
(45) Date of Patent: Jul. 29, 2008

(54) DISPLAY APPARATUS AND ANTIREFLECTION SUBSTANCE

(75) Inventor: Kazuo Watanabe, Kanagawa (JP)

(73) Assignee: Sony Corpotation (JP)

( * ) Notice: Subject to any disclaimer, the term of this patent is extended or adjusted under 35 U.S.C. 154(b) by 0 days.

(21) Appl. No.: 10/250,579

(22) PCT Filed: Nov. 6, 2002

(86) PCT No.: PCT/JP02/11570

§ 371 (c)(1),
(2), (4) Date: Nov. 26, 2003

(87) PCT Pub. No.: WO03/040782

PCT Pub. Date: May 15, 2003

(65) Prior Publication Data

US 2004/0076835 A1 Apr. 22, 2004

(30) Foreign Application Priority Data

Nov. 6, 2001 (JP) ............................. 2001-341022

(51) Int. Cl.
*B32B 17/00* (2006.01)
(52) U.S. Cl. ....................... 428/432; 428/446
(58) Field of Classification Search ................ 428/411, 428/426, 428, 432, 688, 698, 332, 334, 446, 428/448, 697, 701, 702, 704; 359/507, 577, 359/580, 581, 582, 586, 588
See application file for complete search history.

(56) References Cited

U.S. PATENT DOCUMENTS

| | | | | |
|---|---|---|---|---|
| 4,255,474 A | * | 3/1981 | Smith, Jr. ...................... | 428/46 |
| 6,074,730 A | * | 6/2000 | Laird et al. ................. | 428/212 |
| 6,210,787 B1 | * | 4/2001 | Goto et al. ............... | 428/301.4 |
| 6,284,382 B1 | * | 9/2001 | Ishikawa et al. ............ | 428/428 |
| 6,611,090 B1 | * | 8/2003 | Ishikawa et al. ............ | 313/461 |

(Continued)

FOREIGN PATENT DOCUMENTS

DE    198 54 645 A1    6/1999

(Continued)

OTHER PUBLICATIONS

International Search Report Dec. 10, 2002.

*Primary Examiner*—Timothy M. Speer
*Assistant Examiner*—Gordon R Baldwin
(74) *Attorney, Agent, or Firm*—Rader Fishman & Grauer PLLC; Ronald P. Kananen (57) ABSTRACT

The present invention provides an antireflection substance such as an antireflection film having a low moisture-permeable characteristic, high quality and high reliability, and also provides a display apparatus comprising this antireflection substance. The antireflection substance according to the present invention includes an antireflection film formed on a transparent substrate, the antireflection film being composed of a multiple layer in which a first layer serving as an adhesion-improving layer, a second layer serving as a barrier layer against moisture, a third layer, a fourth layer and a fifth layer are laminated in this order, and in which the second layer and the fourth layer are each set to have a refractive index higher than that of the third layer and the fifth layer. The display apparatus according to the present invention comprises this antireflection substance on its display surface.

23 Claims, 4 Drawing Sheets

U.S. PATENT DOCUMENTS 6,746,775 B1 * 6/2004 Boire et al. .................. 428/432

FOREIGN PATENT DOCUMENTS

| | | | |
|---|---|---|---|
| DE | 198 54 645 A 1 * | 6/1999 | |
| JP | 1-168855 A | 7/1989 | |
| JP | 11-218603 A | 8/1999 | |
| JP | 11-250805 A | 9/1999 | |
| JP | 2000-211053 A | 8/2000 | |
| JP | 2000-221302 A | 8/2000 | |
| WO | WO0003290 * | 1/2000 | |

* cited by examiner

DISPLAY APPARATUS AND ANTIREFLECTION SUBSTANCE

TECHNICAL FIELD

The present intention relates to a display apparatus comprising what is called an antireflection substance such as an antireflection film or an antireflection substrate on its display surface, as well as the antireflection substance.

BACKGROUND ART

In such a display apparatus that includes a cathode-ray tube for example, an antireflection film is stuck or its display surface in order to realize a high picture quality by reducing reflections of surroundings, improving the contrast, and so on. The antireflection film is formed on a transparent substrate.

Figure 1:
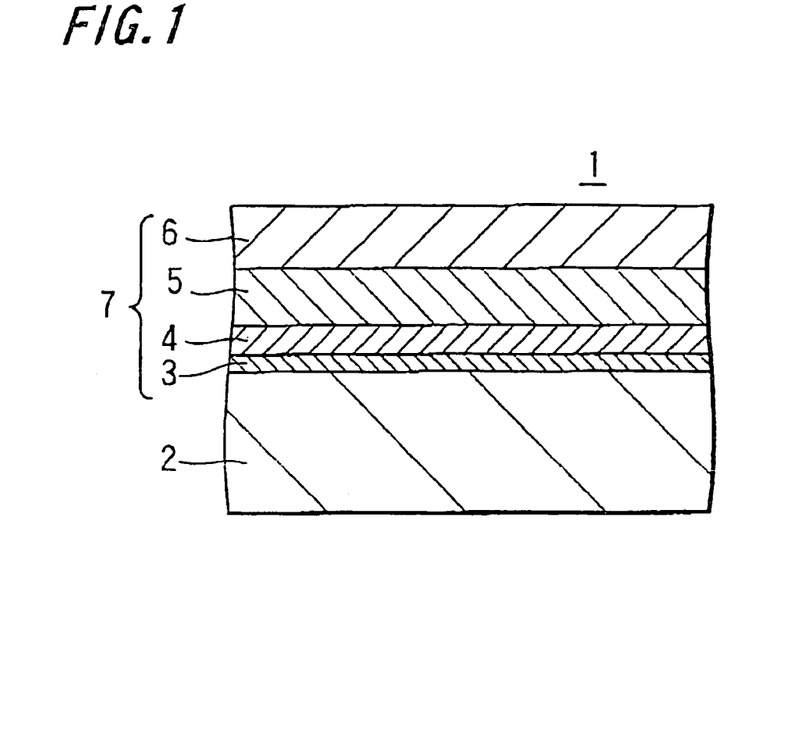
FIG. 1 is a structure diagram showing an example of a conventional antireflection film.

It is well known that the conventional antireflection film is formed of a laminate of silicon oxide and titanium oxide. FIG. 1 shows a conventional typical antireflection film. This antireflection film 1 includes an antireflection subfilm 7 of a four-layer structure formed on one side of a transparent substrate 2 made of a resinous substrate (filmy substance) of, e.g. polyethylene terephthalate (PET) or the like. The antireflection subfilm 7 is formed by laminating successively a first layer of high-refractive-Index titanium oxide ($TiO_2$) film 3, a second layer of low-refractive-index silicon oxide ($SiO_2$) film 4, a third layer of high-refractive-index titanium oxide ($TiO_2$) film 5, and a fourth layer of low-refractive-index silicon oxide ($SiO_2$) film 6. The thickness of the first layer of titanium oxide film 3 is 13 nm; the thickness of the second layer of silicon oxide film 4 is 20 nm; the thickness of the third layer of titanium oxide film 5 is 98 nm; the thickness of the fourth layer of silicon oxide film 6 is 92 nm. Optical characteristics of the antireflection subfilm 7 are such that the average reflectance Rave is 0.28% and the maximum reflectance P is 1.19% (both are values in the range of wavelengths from 450 nm to 650 nm).

The antireflection subfilm 7 can be formed by a film-forming apparatus such as a sputtering system using targets of metal oxide and metal nitride or a reactive sputtering system using metal targets.

When the film-forming apparatus by reactive sputtering is employed, if a speed of forming the silicon oxide film is 60 nm×m/min and a speed of forming the titanium oxide film is 12 nm×m/min, then the number of cathodes (so-called targets) required for obtaining a running speed of 0.5 m/min of the filmy transparent substrate will be 8 pairs. Because of a slow speed of forming the titanium oxide film, it is difficult to obtain the transparent film at a high film-forming speed. Thus, in order to increase the film thickness, the number of targets must be increased as follows:

Details of the number of cathodes are $SiO_2$ (one cathode)/ $TiO_2$ (five cathodes)/$SiO_2$ (one cathode)/$TiO_2$ (one cathode).

Incidentally, as described above, although the titanium oxide film and silicon oxide film can be formed using the sputtering by targets of metal oxide and metal nitride or the reactive sputtering by metal targets, a speed of forming the transparent titanium oxide film having a high refractive index is so small between them that productivity of the antireflection subfilm is low. In addition, when forming a film of metal oxide and metal nitride, the reactive sputtering can raise the film-forming speed rather than the sputtering. Therefore, from an industrial viewpoint, an optical design and film structure is desired, which are capable of making a high-refractive-index layer of low film-forming speed as thin as possible.

By the way, a speed of forming a typical titanium oxide film is about 15% of that of a silicon oxide film in case of reactive sputtering of a titanium material. For example, when forming the titanium oxide film while the resinous film forming the substrate is kept running at a speed of 1 m/min, its thickness of 7~12 nm can be obtained. On this occasion, a speed of forming the titanium oxide film is 7~10 nm×m/min. On the other hand, the silicon oxide film used as a low-refractive-index layer can provide a film-forming speed of about 45×60 nm by the reactive sputtering. This means that productivity of the antireflection film depends on a thickness of titanium oxide film having a high refractive index and low film-forming speed.

The optical films composing the antireflection film are industrially produced by the above-described reactive sputtering process using metal targets. However, wish this reactive sputtering technique, if gas is gushed out of the substrate, the film-forming becomes unstable. For example, while an amount of produced oxygen when the titanium oxide film is formed is about 10 sccm, if an excessive activated gas is supplied by the gas gushed out of the substrate (so-called outgas), then the film-forming speed and optical constants will change, thus making it difficult to obtain a desired film thickness and optical characteristics. When the resinous substrate is employed for the transparent substrate of antireflection film, plenty of moisture may be spouted during the sputtering. If a residual gas in a film-forming chamber increases due to the gushed gas caused by that moisture, the film-forming speed goes down, making a bad effect on the film-forming.

On the other hand, when, for example, the antireflection subfilm in four layers of silicon oxide film and titanium oxide film is formed on the PET film substrate, the conventional antireflection film itself has a bad permeability against moisture. Consequently, when the antireflection film is stuck on the surface of a CPT panel, the antireflection subfilm or the antireflection film itself deteriorates, exfoliates and falls away under a high-temperature and high-humidity environment.

DISCLOSURE OF THE INVENTION

The present invention provides a display apparatus comprising an antireflection substance having an excellent reliability under a high-temperature and high-humidity environment, as well as the antireflection substance.

The present invention provides a display apparatus comprising an antireflection substance having excellent productivity, as well as the antireflection substance.

The present invention provides a display apparatus comprising an antireflection substance capable of a precise optical design, as well as the antireflection substance.

The antireflection substance according to the present invention includes an antireflection subfilm formed on a transparent substrate, that is composed of a multiple layer in which a first layer serving as an adhesion-improving layer, a second layer serving as a barrier layer against moisture, a third layer, a fourth layer, and a fifth layer are laminated in this order, and in which refractive indexes of the second layer and the fourth layer are set to be higher than those of the third layer and the fifth layer, respectively.

The display apparatus according to the present invention comprises an antireflection substance on its display surface, including an antireflection subfilm formed on a transparent substrate, in which a first layer serving as an adhesion-improving layer, a second layer serving as a barrier layer against moisture, a third layer, a fourth layer and a fifth layer are laminated in this order, and in which refractive indexes of the second layer and fourth layer are set to be higher than those of the third layer and fifth layer, respectively.

In the antireflection substance, it is preferable to form the second layer whose refractive index in a visible-light region is 1.7 to 2.4, and whose physical thickness is 10 nm to 50 nm. It is also desired to form the second layer whose attenuation coefficient in the range of wavelengths 450 nm to 650 nm is 0.1 or less.

The second layer can be formed of silicon nitride or silicon oxidic nitride using the reactive physical vapor deposition technique. Moisture permeability of the second layer is desired to be 0.6 g/m²/day or less.

It is preferable to form the substance including the transparent substrate and antireflection subfilm so as to have reflectance of 4.0% or less in the range of wavelengths 450 nm to 650 nm, light transmissivity of 90.0% or more at the central wavelength 550 nm, and also light transmissivity of 90.0% or more at both wavelengths 450 nm and 650 nm. It is desirable for surface resistance of the antireflection subfilm to be $10^9 \Omega/\square$ or more.

The fourth layer is desirably composed of metal oxide or metal nitride whose refractive index in a visible-light region is 1.9 to 2.4 and whose physical thickness is 18 nm to 50 nm. The fourth layer is an optical film different from the second layer and can be composed of one kind of film material selected among titanium oxide, niobium oxide, tantalum oxide, niobium nitride, and zirconium oxide.

Moisture permeability of the substance including the transparent substrate and antireflection subfilm is desired to be less than 1 g/m² day.

The first layer serving as an adhesion-improving layer is desirably composed of metal oxide, metal nitride, or metal oxidic nitride whose physical thickness is 3 nm to 10 nm and whose light transmissivity in a visible-light region is 86% to 92%.

Because the antireflection substance has the second layer serving as a moisture-resistant barrier layer, the moisture spout from the transparent substrate is restricted in the film-forming of the second layer and after, and in turn the gas gush due to the moisture spout is restricted. Thus, a steady film thickness and optical characteristics can be obtained and also the film-forming speed is increased. Because high-refractive-index films of the second layer and fourth layer are composed of mutually different film materials, the fourth layer and in turn the antireflection subfilm can be made into a thin film. The antireflection substance according to the present invention has a low moisture-permeable characteristic and so, when it is applied to a display apparatus, the antireflection subfilm or the antireflection substance itself will unlikely deteriorate, exfoliate and fall away.

According to the antireflection substance of the present invention, because it includes the second layer on the transparent substrate, which has a high refractive index and forms a low moisture-permeable barrier layer, it is possible to improve its reliability even under a high-temperature and high-humidity environment. When forming optical films using the reactive sputtering, the moisture spout from the transparent substrate can be restricted by virtue of the second layer as a barrier layer. Thus, a desirable film thickness and optical characteristics can be obtained and also stable and high-speed film-forming can be realized. By forming a high-refractive-index barrier layer as the second layer, it is possible to form a stable multilayer optical thin film and provide an antireflection substance capable of precise optical design. Because high-refractive-index films of the second layer and fourth layer are composed of mutually different film materials, the fourth layer and in turn the antireflection subfilm can be made into a thin film. Because the antireflection substance according to the present invention enables the film-forming speed to be increased, its productivity can be improved as compared with that of the conventional antireflection film. Because a surface resistance of the antireflection subfilm is highly resistant, charge is not accumulated even when charged up and no electric shack will occur without providing an earth function.

According to the display apparatus of the present invention, because its display surface is provided with the antireflection substance having the antireflection subfilm including the barrier layer of a high refractive index and a low moisture-permeability, it is possible to prevent the antireflection subfilm or antireflection substance itself from deteriorating, exfoliating and falling away even under a high-temperature and high-humidity environment, whereby the reliability as display apparatus can be improved. Because the antireflection subfilm is composed of high-resistance films, the accumulation of charge is restricted and so the occurrence of electric shock to the human body is decreased, whereby the reliability of the display apparatus can be improved. Besides, the earth function can be dispensed with, so that the production cost can be reduced. Furthermore, because the antireflection substance according to the present invention has the low moisture-permeable characteristic, even in a display apparatus using materials whose performance is remarkably deteriorated by absorbing moisture, the performance deterioration of the used materials can be prevented, whereby a highly reliable display apparatus can be provided.

BEST MODE FOR CARRYING OUT THE INVENTION

Various embodiments of the present invention will be described below with reference to the accompanying drawings.

Figure 2:
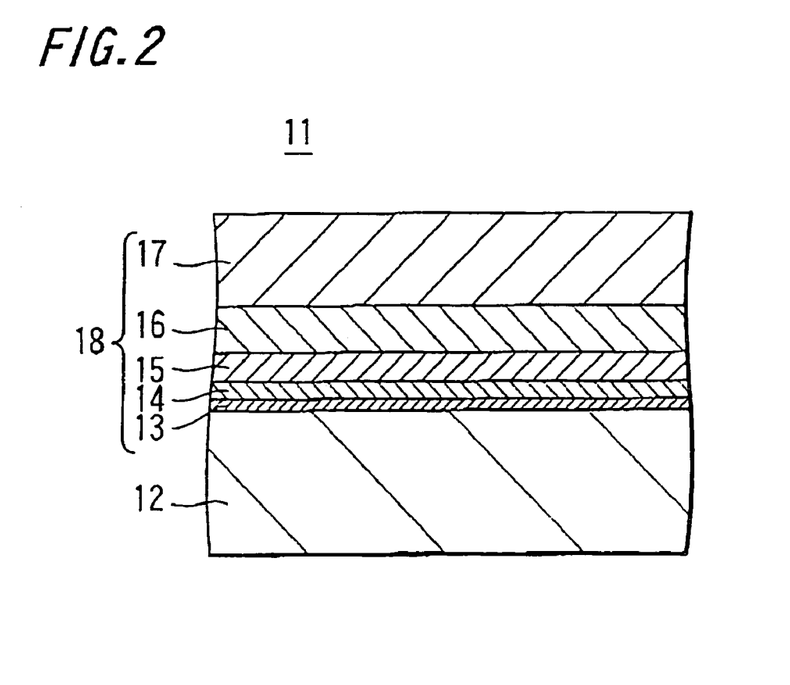
FIG. 2 is a structure diagram showing an embodiment of the antireflection substance according to the present invention.

FIG. 2 shows an embodiment of the antireflection substance according to the present invention.

The antireflection substance 11 in this embodiment includes an antireflection subfilm 18 formed on a transparent substrate 12, composed of a multiple layer in which a first layer 13 serving as an adhesion-improving layer, a second layer 14 serving as a moisture-resistant barrier layer and having a first refractive index (high refractive index), a third layer 15 having a second refractive index (low refractive index), a fourth layer 16 having a third refractive index (high refractive index) and a fifth layer 17 having a fourth refractive index (low refractive index) are laminated in this order. Refractive indexes of the second layer 14 and the fourth layer 16 are set to be higher than those of the third layer 15 and the fifth layer 17. The second layer 14 as barrier layer and the fourth layer 16 have a high refractive index and are formed of a high resistance film, respectively. Moreover, the second layer 14 and the fourth layer 16 are formed of mutually different optical films.

The transparent substrate 12 can be composed of, e.g. polyethylene terephthalate (PET), polyethylene naphthalate (PEN), acrylic, polymethylpentane (PMP), polycarbonate (PC), glass and so on. In case of the glass, a thin glass plate, a glass-coated film and the like can be employed. The first layer 13 serving as an adhesion-improving layer can be formed of, e.g. a silicon oxide ($SiO_x$: X=0.2~2.0) film. The second layer 14 as a barrier layer having a high refractive index and high resistance can be formed of, e.g. a silicon nitride (SiN) film, a silicon oxidic nitride (SiON) film and the like. The third layer 15 having a low refractive index can be formed of, e.g. a silicon oxide ($SiO_2$) film or the like. The fourth layer 16 having a high refractive index and high resistance can be composed of, e.g. one kind of film material selected among titanium oxide, niobium oxide, niobium nitride, tantalum oxide, and zirconium oxide. In other words, it can be formed of, e.g. a film of $TiO_2$, $TiO_x$ (X=0.4~2.0), $Nb_2O_5$, NbN, $Ta_2O_5$, $ZrO_2$ and so on. The fifth layer 17 having a low refractive index can be formed of, e.g. a silicon oxide ($SiO_2$) film.

When a film of resin such as polyethylene terephthalate, polyethylene naphthalate, acrylic, polymethylpentane, polycarbonate and the like is employed for the transparent substrate 12, the antireflection substance 11 is constructed as an antireflection film. When a material such as glass or a mode, which does no fall within a category of film, is employed for the transparent substrate 12, the antireflection substance 11 is constructed as an antireflection substrate.

In the following, the antireflection substance 11 constructed as the antireflection film will be described.

It is desirable for the first layer 13 serving as an adhesion-improving layer to absorb the smallest amount of light as possible and to have a physical thickness of 10 nm or less. For example, it is preferable for the first layer 13 to be formed of a film of metal oxide, metal nitride, or metal oxidic nitride having a physical thickness of 3~10 nm and to have light transmissivity in a visible-light region between 86% and 92%. Examples of material applicable to the first layer 13 are oxide, nitride, and oxidic nitride of Zr, Nb, Ti, Al, Cr and so on.

The second layer 14 as the barrier layer is desired to be formed of a film having a refractive index of 1.7~2.4 in a visible-light region and a physical thickness of 10 nm~50 nm or so. If the refractive index in a visible-light region deviates from the range of 1.7~2.4, then it is impossible to obtain necessary optical characteristics. A refractive index of the second layer 14 can obtain a value of 2.4 when pure material is employed. However, considering dispersion of the material composition, the above-described range is obtainable. If the physical thickness is thinner than 10 nm, then light reflectance will increase. If it exceeds 50 nm, it will be difficult to obtain high productivity under the influence of film-forming speed. The second layer 14 as the barrier layer is desired to have an attenuation coefficient of 0.1 or less in the range of wavelengths 450~650 nm so as to be transparent. If it exceeds 0.1, then light absorption will increase with the result that light transmissivity of 90% or more will be difficult to obtain. The second layer 14 should have moisture permeability of 0.6 $g/m^2$ per day (i.e. 0.6 $g/m^2$/day) or less. If it has this value, even when the antireflection film 11 is stuck on the display surface of a display apparatus and subjected to a high-temperature and high-humidity environment test, the optical film or antireflection film itself can endure without exfoliating. Besides, even when the optical film is formed, the moisture spout out of the substrate 12 is restricted and no bad effect is made on the film-forming speed and optical characteristics, which allows high reliability to be obtained.

The third layer 15 can have a physical thickness of 4 nm to 80 nm and a refractive index of 1.4~1.5. The fourth layer 16 is desirably formed of a film whose refractive index in a visible-light region is 1.9~2.4 and whose physical thickness is 18 nm to 50 nm or so. If the refractive index in a visible-light region deviates from 1.9~2.4, then the same necessary optic characteristics as that of the second layer 14 cannot be obtained. It the physical thickness becomes thinner than 18 nm, the optical reflectance increases. If it exceeds 50 nm, the light absorption increases and light transmissivity decreases. The fifth layer 17 can have a physical thickness of 80 nm to 131 nm and a refractive index of 1.4~1.5.

The antireflection film 11 including the transparent substrate 12 and antireflection subfilm 18 is formed so as to have, for making a permeating color transparent, light reflectance of 4% or less in the range of wavelengths 450 nm to 650 nm and light transmissivity of 90% or more at the central wavelength 550 nm and also in the range of wavelengths 450 nm to 650 nm. It is desirable for moisture permeability of the antireflection film 11 including the transparent substrate 12 and antireflection subfilm 18 to be set at less than 1 $g/m^2$/day. In the case of this value, even when the antireflection film 11 is stuck on the display surface of a display apparatus and subjected to a high-temperature and high-humidity environment test, the optical film or antireflection film itself can endure without exfoliating.

Surface resistance of the antireflection subfilm 18, i.e. resistance value of the entire antireflection subfilm 18 (five layers) is preferably set at $10^9 \Omega/\square$ or more. Surface resistance of the second layer 14 can be set at $10^{11} \Omega/\square$ or more. Surface resistance of the fourth layer 16 can be set at $10^9 \Omega/\square$ or more. The third layer 15 and fifth layer 17 are dielectric films (e.g. $SiO_2$) and consequently high resistance films. The first layer 13 is an adhesive layer and not a complete oxide, but it has a very small thickness and forms a high resistance film. If the surface resistance (so-called sheet resistance) is $10^9 \Omega/\square$ or more, then accumulation of charge on the antireflection film is restricted and an electric shock to the human body will rarely occur without providing an earth function.

Each of the optical films of the antireflection subfilm 18 formed on the transparent substrate 12 can be formed by means of reactive sputtering, sputtering, vacuum evaporation, CVD (chemical vapor deposition) and so forth. Among all those techniques, it is preferable from a viewpoint of productivity to produce the films by reactive physical vapor deposition such as magnetron reactive sputtering.

An example of the manufacturing process of the antireflection film 11 will be shown below. The surface of the transparent substrate 12 is subjected to a glow discharge processing in an atmosphere of $O_2$, Ar, $N_2$ or in one kind or two kinds of atmospheres selected among $O_2$, Ar, $N_2$ for activating the surface of the transparent substrate 12. Subsequently, in order to obtain a strong adhesion between the substrate 12 and antireflection subfilm 18, the first layer 13 is composed of, e.g. $SiO_x$. Because the $SiO_x$ film 13 has little optic absorption, it preferably has a thickness of 10 nm or less for the transparent optical film. It is desired that the first layer 13 absorbs the smallest amount of light as is possible. When the first layer 13 is composed of a single layer, a preferable optimum condition is that light transmissivity ranges from 86% to 92% which are feasible high transmissivities.

The second layer 14 of a high refractive index and high resistance serving as the barrier layer is formed by reactive sputtering. It is preferable for the film 14 to be formed of a silicon nitride film which is produced by reactive-sputtering a boron (B)-doped-silicon target in an atmosphere of argon (Ar) and nitrogen ($N_2$). Because of a small variation of optical constants to a change in flow of introduced nitrogen gas, the silicon nitride film functions as an optical film which stably exhibits high transparence, has a high refractive index, and a high resistance under a wide film-forming condition. Because the silicon nitride film can restrict the effect of gas gush from the surface of the substrate 12 owing to its barrier characteristic, the subsequent forming of optical films can be performed stably.

The third layer 15 of low refractive index is formed of a silicon oxide ($SiO_2$) film produced by reactive-sputtering a boron (B)-doped-silicon target as a low-refractive-index material in an atmosphere of argon (Ar) and oxygen ($O_2$). The fourth layer 16 is formed with a film of a high refractive index and high resistance. The fourth layer 16 is desired to be a titanium oxide file produced by reactive-sputtering a titanium (Ti) target and a titanium oxide ($TiO_x$: X=0.4~2.0) target in an atmosphere of argon (Ar) and oxygen ($O_2$). A film made into a complete oxide by reactive-sputtering a low-class-oxide ($TiO_x$) target may sometimes have good optical characteristics. When an oxide target is employed instead of a metal target, high productivity cannot be expected because of the slow film-forming speed. The fifth layer 17 is composed of a low-refractive-index film. It is desirable for the fifth layer 17, similar to the third layer 15, to be composed of a silicon oxide ($SiO_2$) film formed by reactive-sputtering a boron (B)-doped-silicon target. From an industrial viewpoint, the use of the reactive-sputtering process allows high productivity to be expected.

Table 1 shows an example of conditions for forming the antireflection film 11 according to the present embodiment. However, the respective conditions of forming optical films are those when one cathode (target) is used in Table 1, plasma process means a process in which the surface of resinous substrate forming the substrate is cleaned and activated by plasma processing to obtain satisfactory adhesion of optical films. The running speed corresponds to the resinous substrate (filmy body).

TABLE 1

| Process | Material | Target | Ar Flow | N2 Flow | $O_2$ Flow | Supplied Power (kw) | Running speed (m/min) |
|---|---|---|---|---|---|---|---|
| Plasma process | Ar | No target | 40 sccm | Null | Null | 0.2 | 0.40 |
| The 1st layer | $SiO_x$ | Si | 100 sccm | Null | 3-6 sccm | 1.0 | 0.40 |
| The 2nd layer | SiN | Si | 100 sccm | 60 sccm | Null | 4.4 | 0.40 |
| The 3rd layer | $SiO_2$ | Si | 100 sccm | Null | 20 sccm | 6.1 | 0.40 |
| The 4th layer | $TiO_2$ | Ti | 100 sccm | Null | 10 sccm | 4.5 | 0.40 |
| The 5th layer | $SiO_2$ | Si | 200 sccm | Null | 80 sccm | 11.0 | 0.40 |

For a specific example of the present embodiment, the antireflection fire 11 is composed by forming the first layer 13 of a 5 nm-thick $SiO_x$ film, the second layer 14 of a 20 nm-thick SiN film, the third layer 15 of a 41 nm-thick $SiO_2$ film, the fourth layer 16 of a 25 nm-thick $TiO_2$ film, and the fifth layer 17 of a 110 nm-thick $SiO_2$ film on the transparent substrate 12. With the antireflection film 11 of this structure, optical characteristics with an average reflectance $R_{ave}$ of 0.28% and the maximum reflectance $R_{max}$ of 0.98% can be obtained in the range of wavelengths 450 nm to 650 nm. When the relevant optical film is prepared on the above-described cathode (target) condition, if the film-forming condition of silicon nitride is 13 nm×m/min, a running speed of 1.0 m/min is obtained with eight pairs of cathodes.

In this case, details of the cathodes are $SiO_2$ (two cathodes)/$TiO_2$ (two cathodes)/$SiO_2$ (two cathodes)/SiN (one cathode)/$SiO_x$ (one cathode). As can be seen from the foregoing, by using the antireflection film 11 according to this embodiment, it is possible to solve the past problem regarding low productivity.

Table 2 shows optical characteristics of the antireflection film 11 according to this specific example as well as refractive indexes of the respective optical films.

TABLE 2

| Structure | Material | Refractive index | | | Film thickness (nm) | Average reflectance (%) | Luminous reflectance (%) | Transmissivity (%) wavelength 550 nm |
|---|---|---|---|---|---|---|---|---|
| | | 450 (nm) | 550 (nm) | 650 (nm) | | | | |
| 1st layer | $SiO_x$ | 2.4 | 2.4 | 2.3 | 5 | .28% | .21% | 95% |
| 2nd layer | SiN | 1.94 | 1.89 | 1.94 | 19.6 | | | |
| 3rd layer | $SiO_2$ | 1.48 | 1.44 | 1.44 | 41.1 | | | |
| 4th layer | $TiO_3$ | 2.47 | 2.37 | 2.32 | 25 | | | |
| 5th layer | $SiO_2$ | 1.48 | 1.44 | 1.44 | 109.6 | | | |

Figure 3:
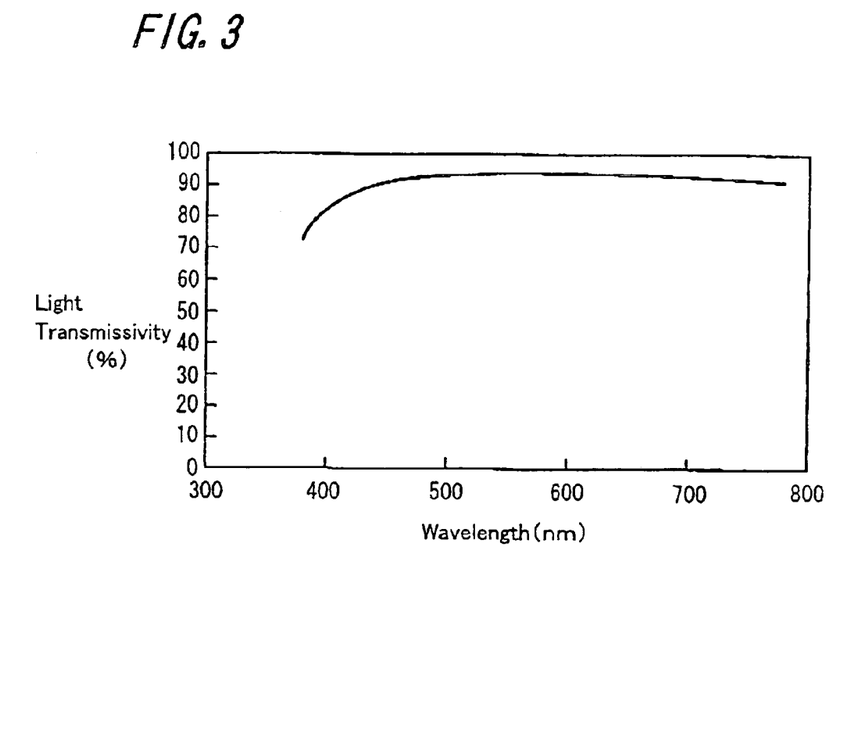
FIG. 3 is a characteristic diagram showing light transmissivity of the antireflection substance according to the present embodiment.

FIG. 3 shows light transmissivity of the antireflection film 11 according to the above concrete example.

Light transmissivity of 90% or more is obtained in the range of wavelengths 450 nm to 650 nm and light transmissivity of 95% is obtained at the central wavelength of 550 nm.

In case of reactive sputtering, a residual gas component produced when films are formed has a great physical significance. As to those in which the film-forming speed or optical constants change depending on oxygenic concentration such as titanium oxide, it is necessary to reduce the residual gas. A large amount of the residual gas causes the film-forming speed to remarkably decrease. Contrarily, if it is small in amount, optical light absorption will occur, which makes it difficult to form a transparent film. Particularly, when a plastic substrate is employed for the transparent substrate 12, the sputtering may involve a large amount of the moisture spout. To cope with this problem, previous drying of the resinous substrate can restrict the gas gush to some extent. However, a temperature rise due to plasma radiation in the sputtering process and the gas gush under the influence thereof are difficult to restrict. Particularly, when the filmy substrate is employed, because the substrate is continuously supplied to the process, the residual gas during the sputtering changes continuously.

Table 3 shows a moisture-permeable characteristic of each optical film employed in the antireflection film 11 according to the present embodiment.

TABLE 3

| Material | Structure | Moisture Permeability (g/m$^2$/day) | | | | | thickness |
|---|---|---|---|---|---|---|---|
| | | Average | σ | Maximum | Minimum | n | |
| PET | HC-PET | 3.585 | 0.107 | 3.69 | 3.40 | 6 | HC: 6μ PET: 188μ |
| SiN | SiN/HC-PET | 0.248 | 0.004 | 0.25 | 0.24 | 6 | 40 nm |
| TiO$_2$ | TiO$_2$/HC-PET | 3.278 | 0.078 | 3.41 | 3.18 | 6 | 40 nm |
| TiO$_x$ | TiO$_x$/HC-PET | 3.238 | 0.034 | 3.27 | 3.18 | 6 | 40 nm |
| SiO$_x$ | SiO$_x$/HC-PET | 3.308 | 0.075 | 3.42 | 3.20 | 6 | 6 nm |

Table 3 shows measured values of moisture permeability (g/m2/day) of so-called hard coat PET (HC-PET) substrate for the transparent substrate, SiN film, TiO2 film, TiO$_x$ film, and SiO$_x$ film of optical films. The permeability of each optical film correlates to each optical film being formed on the hard coat PET substrate. The hard coat PET substrate is composed by forming a hard coat film 6 μm thick on the surface of PET substrate 188 μm thick. Each thickness of SiN film, TiO$_2$ film, and TiO$_x$ film is 40 nm. The thickness of SiO$_x$ film is 6 nm. A symbol σ in Table 3 is dispersion (a so-called unevenness value) and n is the number of measuring points.

As is shown in Table 3, moisture permeability of a titanium oxide film generally used is as high as that of the PET substrate. In contrast, a silicon nitride film used in this embodiment has low moisture permeability which is a tenth or less of that of the titanium oxide film, and can restrict the gas gush out of the transparent substrate. Therefore, this embodiment can make the reactive sputtering stable and perform at a high-speed when a multiple layer is formed after the second layer 14, as the barrier layer, is formed. In addition, by forming the barrier layer as the second layer 14, it is possible to obtain the antireflection subfilm having excellent reliability under a high-temperature and high-humidity environment.

As described above, according to the antireflection film 11 in the present embodiment, by giving high-transparent and high-resistance characteristics and adding a moisture-resistant barrier characteristic to the antireflection subfilm, a high-quality antireflection film can be provided.

In the antireflection film 11 according to this embodiment, optical films are formed on the transparent substrate 12 and particularly the barrier layer 14 with a high refractive index and low moisture permeability is formed a the second layer, whereby the antireflection subfilm having excellent reliability under a high-temperature and high-humidity environment can be obtained. Moreover, when optical films are formed by reactive sputtering, the moisture spout out of the transparent substrate 12 is restricted and in turn the gas gush is restricted by virtue of the second layer 14 as the barrier layer, so that a desired film thickness and optical characteristics can be obtained and also high-speed film-forming can be realized stably. By forming the high-refractive-index barrier layer of the second layer 14, a stable multilayer optical film can be formed and an antireflection film capable of precise optical design can be provided.

Because the second layer 14 and the fourth layer 16 each having a high refractive index are formed of mutually different materials, it is possible to form, e.g. a thinner TiO$_2$ film of the fourth layer 16 compared to the conventional TiO$_2$ film of the third layer 5 (see FIG. 1), thereby allowing a thinner antireflection subfilm 18 to be formed.

Furthermore, because the antireflection film 11 according to this embodiment has a high film-forming speed, its productivity can be made higher than that of the conventional antireflection film. As compared with the conventional antireflection film having a multiple layer structure of, e.g. six layers or more, improved productivity can be obtained.

The above-described antireflection film 11 according to this embodiment is preferably applied to a display apparatus. Examples of the display apparatus to which it is applicable are a television set having a cathode-ray tube, a projection display apparatus (so-called projector), a plasma display (PDP), a computer display, a. TFT liquid crystal display used with notebook computers and portable terminals, an organic EL display, a field emission display (FED), a film display using, e.g. organic EL or inorganic EL, etc. and other display apparatus.

As described above, the surface of a display apparatus requires an antireflection file in order to realize a high-quality picture by reducing reflection of surroundings, improving the contrast, and so on. In any of the above display apparatus, it is possible to improve picture quality by performing a surface processing called antireflection coating. In recent years, a portable display apparatus has been commercialized and it is assumed that a compact and lightweight display apparatus is used indoors and outdoors. In order to improve visibility of the screen, it is important to reduce unnecessary scattering reflected light and also transmit an image signal to a viewer without deteriorating it.

To realize low reflection and suppression of signal deterioration at the sane time is equivalent to realize a low-reflection characteristic and a flat high-permeable characteristic in a visible-light region. Besides, from an industrial viewpoint, high productivity and high reliability are required for the performance of antireflection film. In an antireflection film of low reliability, by physical contact with a pointing device, a cleaning jig and the like, the multilayer structure of optical films formed on the substrate is broken, exfoliates and falls away, which causes an increase of unnecessary scattering light and the deterioration of image signal. This makes the display apparatus deteriorate in quality.

As described above, optical films composing the antireflection subfilm are formed by sputtering, vacuum evaporation, CVD, and so on. There are restrictions on forming the optical films depending on a film-forming process, a forming method of constituent materials, as well as the structure and performance of film-forming apparatus. The performance relating to productivity and reliability depends on the constituent materials and their combination. The transparent substrate for use in an antireflection film is made of, e.g. PET, PEN, acrylic, PMP, PC and glass, as described above. Among all these materials, when a resinous substrate of PET, PC, PEN, etc. is employed, each optical film formed thereon has a role which determines the performance of the antireflection film.

As described above, when the resinous substrate is employed for the substrate of optical films, the resinous substrate will change in quality due to the phenomena of absorbing and spouting moisture, a typical ingredient in an environmental atmosphere, and a change in temperature. This involves deterioration of the antireflection film. The phenomenon of absorbing moisture, etc. into the resinous substrate can be restricted by forming a barrier layer on the surface. When a display apparatus employs a material whose performance is remarkably deteriorated by absorbing moisture, it is desired that the antireflection film has a low moisture-permeable characteristic.

It is important for each optical film to be composed of a high-resistance film. If the optical film is a low-resistance film, then a function to conduct a charge induced in the conductive film to earth becomes indispensable. In the case where the earth is insufficient, an electric shock may occur due to a charge accumulated in the conductor. Because a high resistance restricts the accumulation and movement of charge, it is less likely for an electric shock to occur caused by the instantaneous movement of charge between the surface of a display apparatus and the human body. Thus, when optical films are high-resistance films, the earth can be unnecessary and so a cost-saving effect for display apparatus will be yielded.

As described above, the antireflection film 11 according to the present embodiment satisfies these conditions. The display apparatus on which this antireflection film 11 is stuck has a low-reflection characteristic in a visible-light region and also a flat light-transmissive characteristic, so that it can display a high-quality picture.

Figure 4:
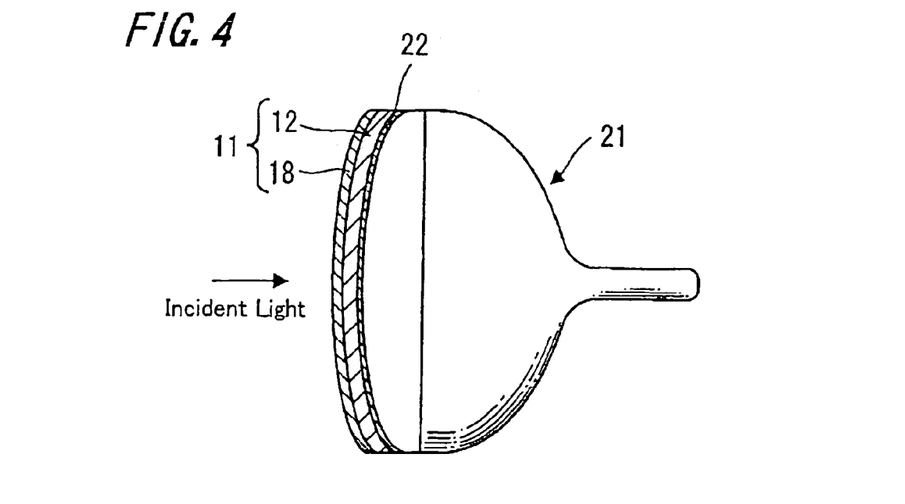
FIG. 4 is a structure diagram showing an embodiment of the display apparatus according to the present invention.

FIG. 4 shows an embodiment of the display apparatus according to the present invention. The display apparatus in this embodiment comprises a cathode-ray tube 21. In this embodiment, the antireflection film 11 of the present invention is stuck on a panel surface forming the display surface of a color or monochrome cathode-ray tube 21, through an adhesive layer 22 made of, e.g. ultraviolet-setting resin (hereinafter referred to as UV resin), an adhesive material or the like. The antireflection film 11 has the above-described antireflection subfilm 18 of a five-layer structure including the barrier layer, formed on the transparent substrate 12. This cathode-ray tube 21 is incorporated into a set to form the display apparatus.

Figure 5:
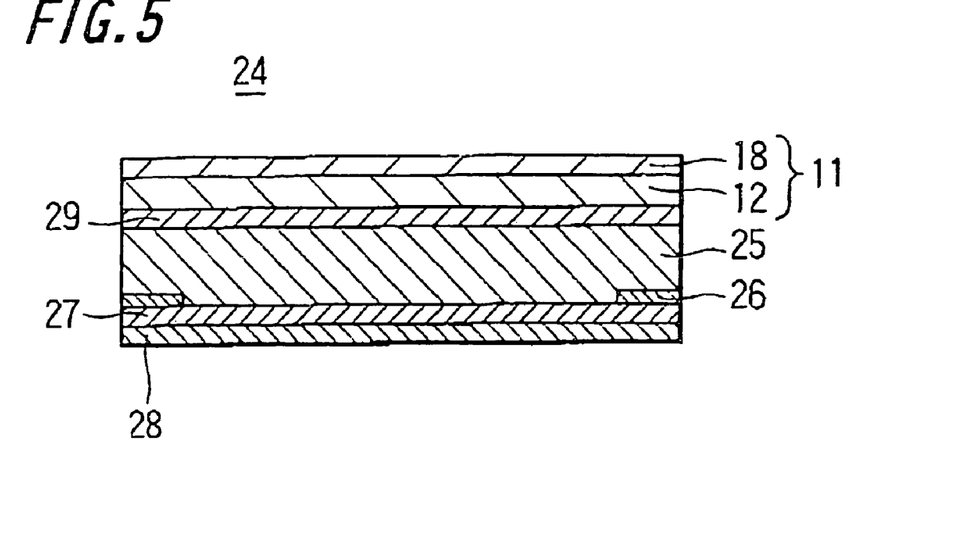
FIG. 5 is a structure diagram showing another embodiment of the display apparatus according to the present invention.

FIG. 5 shows another embodiment of the display apparatus of the present invention when it is applied to a plasma display. The plasma display has various structures, one example of which is shown in FIG. 5. The plasma display 24 according to this embodiment includes a glass substrate 25, i.e. a panel glass on a display side forming a plasma display panel (PDP). A frame-shaped black print layer 26 is formed inside the glass subs-rate 25, and an infrared-cutoff film 27 and an electromagnetic-wave shield mesh 28 are formed. Outside of the glass substrate 25 is formed the above-described antireflection subfilm 18 of five-layer structure including the barrier layer on the transparent substrate 12 through an adhesive layer 29 made of the UV resin, adhesive material and the like. Additionally, the electromagnetic-wave shield mesh 28 is composed of, e.g. copper, iron, nickel alloy, and ferrite. This plasma display panel is incorporated into a set to form a display apparatus, what is called a plasma display.

Figure 6:
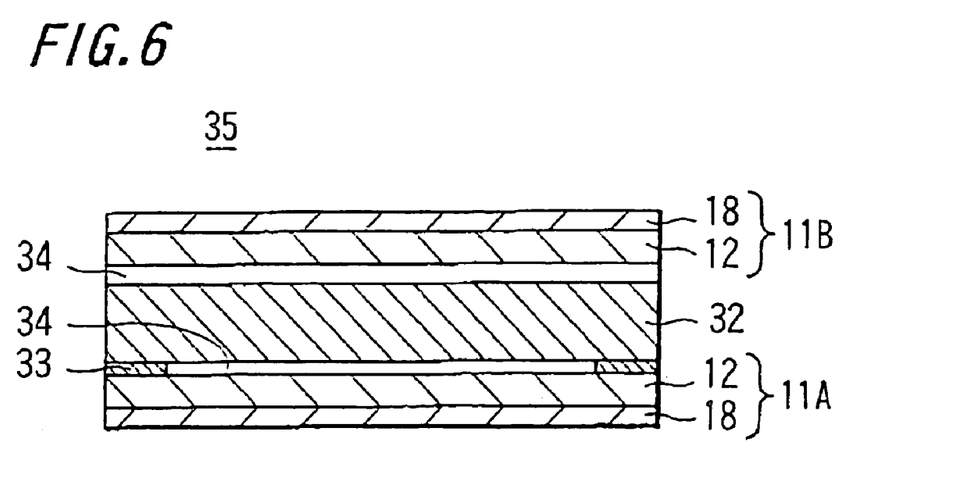
FIG. 6 is a structure diagram showing still another embodiment of the display apparatus according to the present invention.

FIG. 6 shows still another embodiment of the display apparatus of the present invention when it is applied to a rear-projector. Note that FIG. 6 shows a contrast screen serving as the display surface of the rear-projector.

In this embodiment, on one side (a viewing side) of a plastic substrate 32 serving as a screen body of the rear-projector a frame-shaped black print layer 33 is formed and also the antireflection film 11A according to the present invention is adhered by an adhesive layer 34, which has the above-described antireflection subfilm 18 of five-layer structure including the barrier layer formed on the transparent substrate 12. On the other side (an image-projected side) of the plastic substrate 32 the antireflection film 11B according to the present invention is adhered by an adhesive layer 34 as well to compose the contrast screen 35 for rear-projector. The contrast screen 35 is incorporated into the projector body to form a display apparatus, the so-called rear-projector.

Additionally, though no shown, by also adhering the antireflection film 11 according to the present invention on the display surface of a display apparatus such as a computer display, a TFT liquid crystal display for use in a notebook computer and a portable terminal, an organic EL display, a field emission display (FED), and a film display, it is possible to compose a display apparatus by which a high-quality picture is obtained.

According to the display apparatus of this embodiment, because the antireflection film 11 having high-transparent, high-resistant and low moisture-permeable characteristics is adhered to the display surface, it is possible to provide a display apparatus with high quality and high reliability. Particularly, even under a high-temperature and high-humidity environment, the antireflection subfilm 18 or antireflection film 11 itself can be prevented from deteriorating, exfoliating, and falling away. Moreover, because the antireflection subfilm is formed of high-resistance films, the accumulation of charge is restricted and so the electric shock to the human body will decrease, which allows improved reliability of the display apparatus. At the same time, since the earth can be dispensed with, it is possible to reduce a manufacturing cost. Furthermore, because the antireflection film 11 of the present invention has a low moisture-permeable characteristic, even in a display apparatus employing a material whose performance will remarkably deteriorate due to moisture-absorbing by, e.g. the organic EL layer and the like, the deterioration of performance of the employed material can be prevented, so that a high-reliability display apparatus can be provided.

Figure 7:
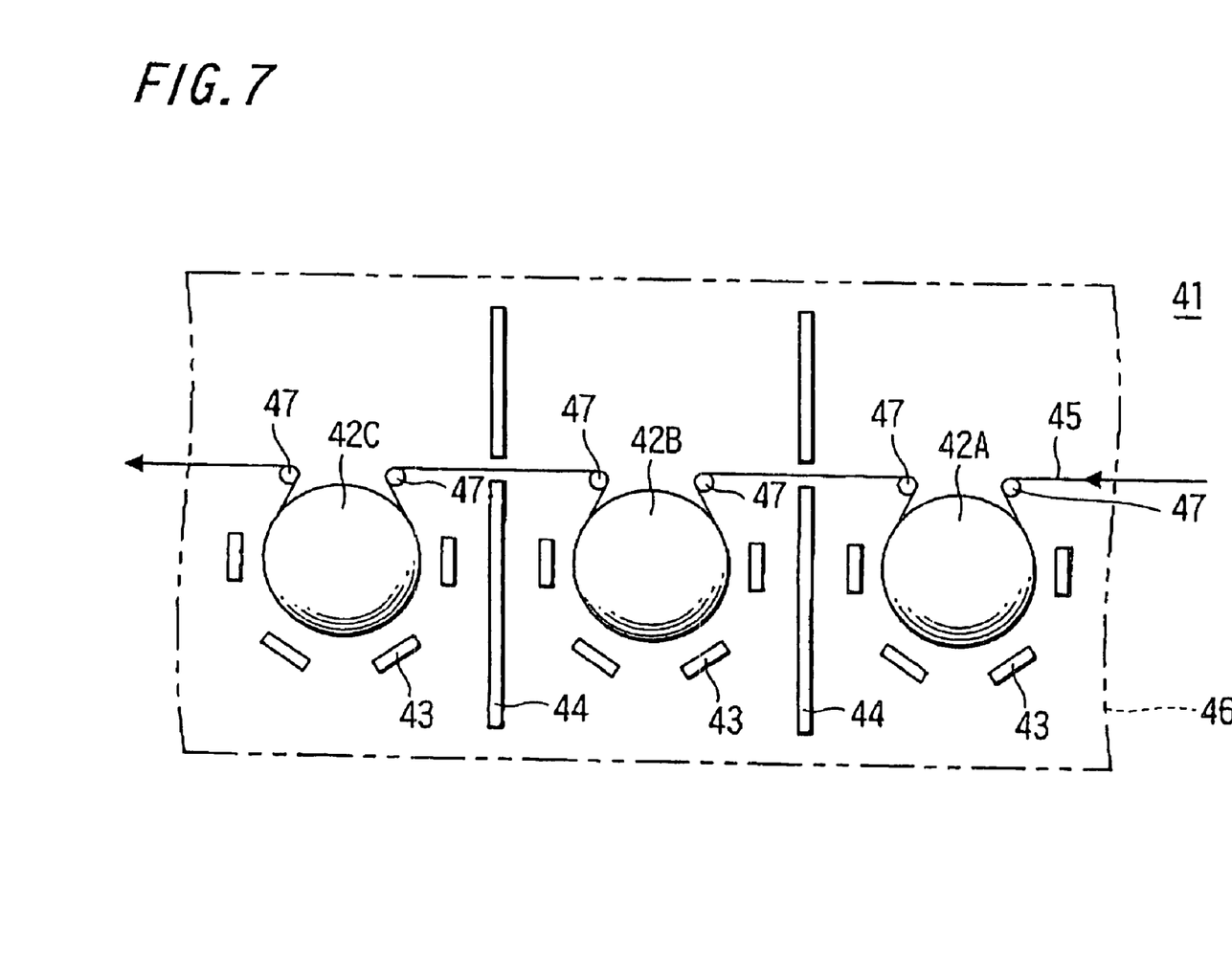
FIG. 7 is a diagram showing a main part of a reactive sputtering system capable of forming continuously optical films of an antireflection film.

FIG. 7 shows a main part of a reactive sputtering system capable of continuously forming optical films or the antireflection film. The reactive sputtering system 41 in this example has a plurality of, three in this example, cans 42 [42A, 42B, 42C] arranged in a sputtering chamber 46. A plurality of targets 43 required for forming optical files are arranged so as to face the respective cans 42A, 42B, and 42C. With respect to the target 43, a plurality of, e.g. four to five targets of the same material or targets of different material can be selectively arranged in the can 42 [42A, 42B, 42C] as necessity requires. An airtight partition member 44 is provided between each can 42, and it is arranged that inactive gas or reactive gas can selectively be supplied to areas surrounded by the partition member 44. A transparent film 45 forming the transparent substrate is made to continuously run along each can 42A, 42B and 42C through guide rollers 47 from its rolled state. The required optical films are formed at positions facing each target 43 and different optical films are sequentially laminated to form the antireflection subfilm. Further, since other structures are the same as those of an ordinary reactive sputtering system, no description will be given. While this example is a three-can system, a two-can system is also preferable. According to this system 41, it is possible to prepare the antireflection film 11 continuously.

Although the case where the antireflection substance of the present invention is applied to the antireflection film has been described in detail, the present invention can also be applied to an antireflection substrate using, e.g. glass for the transparent substrate 12. The antireflection substance having the antireflection subfilm 18 formed on the transparent substrate made of glass, etc. can also be used for, e.g. a transparent panel made of glass, etc. forcing a display apparatus.

The invention claimed is:

1. An antireflection substance characterized by comprising an antireflection film composed of a multiple layer formed on a transparent substrate, in which a first layer serving as an adhesion-improving layer, a second layer serving as a barrier layer against moisture, a third layer, a fourth layer and a fifth layer are laminated in this order; said first layer is composed of $SiO_x$ (x=0.2~2.0) and formed of a film having a thickness of 10 nm or less; said second layer and said fourth layer are each set to have a refractive index higher than that of said third layer and said fifth layer; said second layer is formed of a film having a refractive index of 1.7 to 2.4 in a visible-light region and a physical thickness of 10 nm to 50 nm; and wherein said second layer is composed of silicon nitride, said second layer has moisture permeability of 0.6 g/m²/day or less, and said second layer is composed of a different material from the fourth layer.

2. An antireflection substance according to claim 1, wherein said second layer is formed of a film having an attenuation coefficient of 0.01 or less in the range of wavelengths 450 nm to 650 nm.

3. An antireflection substance according to claim 1, wherein said second layer is produced by a reactive physical vapor deposition process.

4. An antireflection substance according to claim 1, wherein the substance including said transparent substrate and said antireflection film has reflectance of 4.0% or less in the range of wavelengths 450 nm to 650 nm, light transmissivity of 90.0% or more at central wavelength 550 nm, and also light transmissivity of 90.0% or more at the respective wavelengths 450 nm and 650 nm.

5. An antireflection substance according to claim 1, wherein said antireflection film has a surface resistance of $10^{9\Omega/\square}$ or more.

6. An antireflection substance according to claim 1, wherein said fourth layer is composed of metal oxide or metal nitride having a refractive index of 1.9 to 2.4 in a visible-light region and a physical thickness of 18 nm to 50 mm.

7. An antireflection substance according to claim 1, wherein said fourth layer is composed of one kind of material selected among titanium oxide, niobium oxide, tantalum oxide, niobium nitride and zirconium oxide.

8. An antireflection substance according to claim 1, wherein the substance including said transparent substrate and said antireflection film has moisture permeability less than 1 g/m²/day.

9. An antireflection substance according to claim 1, wherein said second layer is formed of a film having a physical thickness of 10 nm to 40 nm.

10. An antireflection substance according to claim 1, wherein said second layer is formed of a film having a physical thickness of 10 nm to 20 nm.

11. An antireflection substance according to claim 1, wherein said second layer is formed of a film having a refractive index of 1.7 to 1.9 in a visible-light region and a physical thickness of 10 nm to 40 nm.

12. A display apparatus characterized by comprising an antireflection substance on the display surface, including an antireflection film composed of a multiple layer formed on a transparent substrate, in which a first layer serving as an adhesion-improving layer, a second layer serving as a barrier layer against moisture, a third layer, a fourth layer and a fifth layer are laminated in this order, said first layer is composed of $SiO_x$ (x=0.2~2.0) and formed of a film having a thickness of 10 nm or less, said second layer and said fourth layer are each set to have a refractive index higher than that of said third layer and said fifth layer, and wherein said second layer is composed of silicon nitride, said second layer has moisture permeability of 0.6 g/m²/day or less, and said second layer is composed of a different material from the fourth layer.

13. A display apparatus according to claim 12, wherein on the display surface the display apparatus includes said antireflection substance in which said second layer is formed of a film having a refractive index of 1.7 to 2.4 in a visible-light region and a physical thickness of 10 nm to 50 nm.

14. A display apparatus according to claim 12, wherein on the display surface the display apparatus includes said antireflection substance in which said second layer is formed of a film having an attenuation coefficient of 0.1 or less in the range of wavelengths 450 nm to 650 nm.

15. A display apparatus according to claim 12, wherein on the display surface the display apparatus includes said antireflection substance in which said second layer is by a reactive physical vapor deposition process.

16. A display apparatus according to claim 12, wherein on the display surface the display apparatus includes said antireflection substance in which the substance including said transparent substrate and said antireflection film has reflectance of 4.0% or less in the range of wavelengths 450 nm to 650 nm, light transmissivity of 90.0% or more at the central wavelength 550 nm, and also light transmissivity of 90.0% or more at the respective wavelengths 450 nm and 650 nm.

17. A display apparatus according to claim 12, wherein on the display surface the display apparatus includes said antireflection substance in which said antireflection film has a surface resistance of $10^{9\Omega/\square}$ or more.

18. A display apparatus according to claim 12, wherein on the display surface the display apparatus includes said antireflection substance in which said fourth layer is composed of metal oxide or metal nitride having a refractive index of 1.9 to 2.4 in a visible-light region and a physical thickness of 18 nm to 50 nm n.

19. A display apparatus according to claim 12, wherein on the display surface the display apparatus includes said antireflection substance in which said fourth layer is composed of one kind of material selected among titanium oxide, niobium oxide, tantalum oxide, niobium nitride, and zirconium oxide.

20. A display apparatus according to claim 12, wherein on the display surface the display apparatus includes said antireflection substance in which the substance including said transparent substrate and said antireflection film has moisture permeability less than 1 g/m²/day.

21. A display apparatus according to claim 12, wherein said second layer is formed of a film having a physical thickness of 10 nm to 40 nm.

22. A display apparatus according to claim 12, wherein said second layer is formed of a film having a physical thickness of 10 nm to 20 nm.

23. A display apparatus according to claim 12, wherein said second layer is formed of a film having a refractive index of 1.7 to 1.9 in a visible-light region and a physical thickness of 10 nm to 40 nm.

* * * * *

UNITED STATES PATENT AND TRADEMARK OFFICE
CERTIFICATE OF CORRECTION

PATENT NO. : 7,405,005 B2
APPLICATION NO. : 10/250579
DATED : July 29, 2008
INVENTOR(S) : Kazuo Watanabe It is certified that error appears in the above-identified patent and that said Letters Patent is hereby corrected as shown below:

Column 14, Line 41:
"nm n" should read -- nm --.

Signed and Sealed this

Twenty-third Day of September, 2008

JON W. DUDAS
*Director of the United States Patent and Trademark Office*